(12) United States Patent
Neubauer et al.

(10) Patent No.: US 11,756,432 B2
(45) Date of Patent: Sep. 12, 2023

(54) APPARATUS AND METHOD FOR GUIDING UNMANNED AERIAL VEHICLES

(71) Applicant: Dimetor GmbH, Altenberg bei Linz (AT)

(72) Inventors: Thomas Neubauer, Altenberg bei Linz (AT); Thomas Wana, Vienna (AT)

(73) Assignee: Dimetor GmbH, Altenberg bei Linz (AT)

( * ) Notice: Subject to any disclaimer, the term of this patent is extended or adjusted under 35 U.S.C. 154(b) by 215 days.

(21) Appl. No.: 16/899,808

(22) Filed: Jun. 12, 2020

(65) Prior Publication Data
US 2020/0394927 A1 Dec. 17, 2020

(30) Foreign Application Priority Data

Jun. 14, 2019 (EP) .................................... 19180378

(51) Int. Cl.
*G08G 5/00* (2006.01)
*H04W 4/40* (2018.01)
(Continued)

(52) U.S. Cl.
CPC ........... *G08G 5/0013* (2013.01); *G08G 5/003* (2013.01); *G08G 5/006* (2013.01); *G08G 5/0069* (2013.01);
(Continued)

(58) Field of Classification Search
CPC ............ B64C 2201/146; B64C 39/024; G08G 5/0013; G08G 5/003; G08G 5/006;
(Continued)

(56) References Cited

U.S. PATENT DOCUMENTS

| 7,953,372 B2 | 5/2011 | Ofek et al. |
| 8,184,594 B2 | 5/2012 | Li et al. |

(Continued)

FOREIGN PATENT DOCUMENTS

| AU | 2016368552 B2 | 6/2017 |
| WO | 2011134286 A1 | 11/2011 |

(Continued)

OTHER PUBLICATIONS

Hazim Shakhatreh, et al. "Unmanned Aerial Vehicles (UAVs): A Survey on Civil Applications and Key Research Challenges", IEEE Access, vol. 7, Apr. 9, 2019, pp. 48572-48634, XP011720255,DOI: 10.1109/ACCESS.2019.2909530.

(Continued)

*Primary Examiner* — Khoa Huynh
(74) *Attorney, Agent, or Firm* — THE WEBB LAW FIRM

(57) ABSTRACT

The present disclosure provides a server apparatus and method for detecting connectivity anomalies for guiding unmanned aerial vehicles (UAVs). The apparatus comprises an interface configured for acquiring a connectivity measurement result at a location in the flight area, and circuitry configured for determining a deviation between the measurement result and a predicted connectivity to detect a connectivity anomaly. Further provided is an aviation control node configured for receiving a report on a connectivity anomaly, and a method for an aviation control node. The present disclosure facilitates monitoring of a current connectivity state for providing safe and efficient UAV operation.

13 Claims, 4 Drawing Sheets

(51) Int. Cl.
*H04W 36/00* (2009.01)
*H04W 16/18* (2009.01)
*H04W 36/14* (2009.01)
*H04W 36/32* (2009.01)
*H04W 48/16* (2009.01)

(52) U.S. Cl.
CPC ............. *H04W 4/40* (2018.02); *H04W 16/18* (2013.01); *H04W 36/00837* (2018.08); *H04W 36/14* (2013.01); *H04W 36/32* (2013.01); *H04W 48/16* (2013.01)

(58) Field of Classification Search
CPC .. G08G 5/0069; G08G 5/0026; G08G 5/0043; G08G 5/0091; H04W 4/40; H04W 16/18; H04W 36/00837; H04W 36/14; H04W 36/32; H04W 48/16; H04W 24/04; H04W 24/10; H04W 36/0085
See application file for complete search history.

(56) References Cited

U.S. PATENT DOCUMENTS

| | | | |
|---|---|---|---|
| 9,363,690 | B1 | 6/2016 | Singh et al. |
| 9,818,303 | B2 | 11/2017 | Kotecha |
| 10,438,494 | B1 * | 10/2019 | Hahn .................. G08G 5/0013 |
| 2014/0226584 | A1 | 8/2014 | Cullen et al. |
| 2015/0336667 | A1 | 11/2015 | Srivastava et al. |
| 2016/0300493 | A1 | 10/2016 | Ubhi et al. |
| 2016/0328980 | A1 | 11/2016 | Sharma et al. |
| 2016/0371985 | A1 * | 12/2016 | Kotecha ............... G01C 21/005 |
| 2017/0069214 | A1 | 3/2017 | Dupray et al. |
| 2017/0164257 | A1 | 6/2017 | Ross et al. |
| 2017/0208512 | A1 | 7/2017 | Aydin et al. |
| 2017/0278409 | A1 | 9/2017 | Johnson et al. |
| 2018/0038695 | A1 | 2/2018 | Bitra et al. |
| 2018/0293897 | A1 | 10/2018 | Murphy |
| 2018/0375568 | A1 | 12/2018 | De Rosa et al. |
| 2019/0044609 | A1 | 2/2019 | Winkle et al. |
| 2019/0230606 | A1 | 7/2019 | Ryu et al. |
| 2020/0195521 | A1 | 6/2020 | Bogineni et al. |
| 2020/0266903 | A1 | 8/2020 | De Rosa et al. |
| 2021/0325906 | A1 | 10/2021 | White |
| 2021/0325907 | A1 | 10/2021 | White |
| 2022/0069876 | A1 | 3/2022 | Xue et al. |

FOREIGN PATENT DOCUMENTS

| | | |
|---|---|---|
| WO | 2015114572 A1 | 8/2015 |
| WO | 2018013234 A1 | 1/2018 |
| WO | 2018086140 A1 | 5/2018 |

OTHER PUBLICATIONS

Lin et al., "The Sky Is Not the Limit: LTE for Unmanned Aerial Vehicles", IEEE Communications Magazine, 2018, pp. 204-210, vol. 56, No. 4.

Lin et al., "Prototype Hierarchical UAS Traffic Management System in Taiwan", IEEE Integrated Communications, Navigation, and Surveillance Conference, 2019, pp. 1-13.

"UAS ATM Cars Common Altitude Reference System Discussion Document", European Organisation for the Safety of the Air Navigation (Eurocontrol), 2018, 27 pages, Edition 1.0, retrieved from https://www.eurocontrol.int/sites/default/files/2019-05/uas-atm-cars-v1.0-release-20181127_0.pdf.

"Fact Sheet—Small Unmanned Aircraft Regulations (Part 107)", Federal Aviation Administration, 2016, 3 pages, retrieved from https://www.faa.gov/news/fact_sheets/news_story.cfm?newsId=20516.

"Product Overview", Infovista, 2020, retrieved from https://www.infovista.com/planet/rf-planning-optimization.

"Geodata for RF Planning and Optimization", LuxCarta, 2018, retrieved from https://luxcarta.com/product/geodata-for-rf-planning-and-optimization/.

"Geospatial Products for RF Planning and Optimization", LuxCarta, 2018, retrieved from https://luxcarta.com/resources/LuxCarta_RFPlanning&Optimization_2018_web.pdf.

"Radio Planning", TEOCO, 2020, accessed Jun. 11, 2020, retrieved from https://www.teoco.com/products/planning-optimization/asset-radio-planning/.

"Digital Maps, Radio Frequency (RF) Map, RF Planning", Visicom, 2020, retrieved from https://visicomdata.com/.

"Atoll Overview", Forsk, retrieved from https://www.forsk.com/atoll-over, retrieved on Jun. 25, 2020, 6 pages.

"iBuildNet Professional User Manual", Ranplan Wireless, retrieved from https://ranplanwireless.com/files/National%20Advisory/Advanced%20Material/iBuildNet%204.0%20User%20manual.pdf, retrieved on Jun. 25, 2020, 387 pages.

"Telecommunication", AW3D, retrieved from https://www.aw3d.jp/en/applications/?id=663, retrieved on Jun. 25, 2020, 7 pages.

* cited by examiner

APPARATUS AND METHOD FOR GUIDING UNMANNED AERIAL VEHICLES

CROSS-REFERENCE TO RELATED APPLICATION

This application claims priority to European Patent Application No. 19180378.2 filed Jun. 14, 2019, the disclosure of which is hereby incorporated by reference in its entirety.

BACKGROUND

1. Technical Field

The present disclosure relates to the technical field of wireless communication for air traffic control.

2. Description of Related Art

The operation of unmanned aerial vehicles (UAVs) requires permanent monitoring and control of the position and moving direction of the unmanned aerial vehicle during a flight along a flight path in three-dimensional air space, in order to provide for sufficient safety during operation. In particular, beyond visual line of sight (BVLOS) operation of UAVs imposes new requirements on air traffic control.

SUMMARY

The present disclosure is directed at facilitating air traffic management, in particular for unmanned aerial vehicles in beyond-line-of sight applications and controlled via wireless communication, by validating a prediction of current of network coverage in a three-dimensional flight area using current measurements.

Provided is a server apparatus for detecting connectivity anomalies for guiding an unmanned aerial vehicle, UAV, in a flight area within airspace, comprising a first interface configured for acquiring a result of a connectivity measurement performed by the UAV or a communication terminal different from the UAV at a location within the flight area, and circuitry configured for determining a deviation of the result of the connectivity measurement from a predicted connectivity at the location to detect a connectivity anomaly at the location, wherein the predicted connectivity is obtained from predicted coverage data indicating network coverage in the flight area and currently used for guiding the UAV.

Accordingly, predicted or modelled connectivity and network coverage of a three-dimensional area can be validated, to enable safe aviation of unmanned aerial vehicles.

In some embodiments, the server apparatus comprises a second interface configured for acquiring the predicted connectivity at the location.

For instance, the server apparatus comprises a third interface configured for automatically reporting the connectivity anomaly at the location to an aviation control node.

Accordingly, the aviation control node is enabled to make efficient guiding decisions.

For example, the location is recorded along three-dimensions, and the predicted coverage data indicates network coverage along three dimensions.

Accordingly, precise localization of connectivity anomalies in three dimensions can be performed, to allow for efficient guidance of UAVs.

For instance, the connectivity anomaly is at least one of an anomaly of a signal power and an anomaly of a handover probability of handover by the UAV at the location from one network node to another network node.

In some embodiments, the circuitry is configured for determining an area of risk including the location where aviation of the UAV is to be avoided.

Accordingly, safe guidance of UAVs and maintaining of a sufficient connectivity during flight operation may be facilitated.

For instance, the flight area is divided into a plurality of sub-areas, and the circuitry is configured for determining the area of risk to include a sub-area from among the plurality of sub-areas.

In some embodiments, the first interface is configured for acquiring a plurality of results of connectivity measurements including said connectivity measurement, and the circuitry is configured for determining, based on the plurality of results of connectivity measurements, a trend in the deviation dependent on time or a direction in the three-dimensional flight area.

This facilitates sufficiently early detection of connectivity anomalies.

For example, the detection of connectivity anomalies is performed respectively per wireless communication network from among a plurality of wireless communication networks.

Accordingly, redundancy in connectivity and coverage provided by a plurality of networks can be utilized.

Further provided is a method for detecting connectivity anomalies for guiding an unmanned aerial vehicle, UAV, in a flight area within air space, comprising the following steps to be performed by a server apparatus: acquiring a result of a connectivity measurement performed by the UAV or a communication terminal different from the UAV at a location within the flight area; and determining a deviation of the result of the connectivity measurement from a predicted connectivity at the location to detect a connectivity anomaly at the location, wherein the predicted connectivity is obtained from predicted coverage data indicating network coverage in the flight area and currently used for guiding the UAV.

Accordingly, predicted or modelled connectivity and network coverage of a three-dimensional area can be validated, to enable safe aviation of unmanned aerial vehicles.

In some embodiments, the method comprises acquiring the predicted connectivity at the location.

For example, the method comprises automatically reporting the connectivity anomaly at the location to an aviation control node.

Accordingly, the aviation control node is enabled to make efficient guiding decisions.

For example, the location is recorded along three-dimensions, and the predicted coverage data indicates network coverage along three dimensions.

Accordingly, precise localization of connectivity anomalies in three dimensions can be performed, to allow for efficient guidance of UAVs.

For instance, the connectivity anomaly is at least one of an anomaly of a signal power and an anomaly of a handover probability of handover by the UAV at the location from one network node to another network node.

In some embodiments, the method includes determining an area of risk including the location where aviation of the UAV is to be avoided.

Accordingly, safe guidance of UAVs and maintaining of a sufficient connectivity during flight operation may be facilitated.

For instance, the flight area is divided into a plurality of sub-areas, and the circuitry is configured for determining the area of risk to include a sub-area from among the plurality of sub-areas.

For example, the method comprises acquiring a plurality of results of connectivity measurements including said connectivity measurement, and the circuitry is configured for determining, based on the plurality of results of connectivity measurements, a trend in the deviation dependent on time or a direction in the three-dimensional flight area.

This facilitates sufficiently early detection of connectivity anomalies.

For example, the detection of connectivity anomalies is performed respectively per wireless communication network from among a plurality of wireless communication networks.

Accordingly, redundancy in connectivity and coverage provided by a plurality of networks can be utilized.

Further provided is an aviation control node for guiding an unmanned aerial vehicle, UAV, in a flight area within air space, comprising an input interface configured for receiving, from a server apparatus, a report of a connectivity anomaly determined based on a deviation of a result of a connectivity measurement performed by the UAV or a communication terminal different from the UAV at a location within the flight area and a predicted connectivity at the location obtained from predicted coverage data indicating network coverage in the flight area and currently used for guiding the UAV, and circuitry configured for performing the guiding of the UAV based on the received report of the connectivity anomaly at the location.

This facilitates enabling safe aviation of unmanned aerial vehicles.

For instance, the aviation control node comprises an output node configured for issuing a warning signal or an avoidance command indicating that a sub-section of the flight area including the location is to be avoided by UAVs.

In some embodiments, the circuitry is configured for determining, based on the received report of the connectivity anomaly, an area of risk where aviation of the UAV is to be avoided.

Moreover, provided is a method for guiding an unmanned aerial vehicle, UAV, in a flight area within air space, comprising receiving, from a server apparatus, a report of a connectivity anomaly determined based on a deviation of a result of a connectivity measurement performed by the UAV or a communication terminal different from the UAV at a location within the flight area and a predicted connectivity at the location obtained from predicted coverage data indicating network coverage in the flight area and currently used for guiding the UAV, and performing the guiding the UAV based on the received report of the connectivity anomaly at the location.

This facilitates enabling safe aviation of unmanned aerial vehicles.

For instance, the method comprises issuing a warning signal or an avoidance command indicating that a sub-section of the flight area including the location is to be avoided by UAVs.

In some embodiments, the method comprises determining, based on the received report of the connectivity anomaly, an area of risk where aviation of the UAV is to be avoided.

Further provided is a computer program comprising instructions which, when the program is executed by a server apparatus, cause the server apparatus to carry out the steps of: acquiring a result of a connectivity measurement performed by the UAV or a communication terminal different from the UAV at a location within the flight area; and determining a deviation of the result of the connectivity measurement from a predicted connectivity at the location to detect a connectivity anomaly at the location, wherein the predicted connectivity is obtained from predicted coverage data indicating network coverage in the flight area and currently used for guiding the UAV.

Also provided is a computer program comprising instructions which, when the program is executed by a computer, cause the computer to carry out the steps receiving, from a server apparatus, a report of a connectivity anomaly determined based on a deviation of a result of a connectivity measurement performed by the UAV or a communication terminal different from the UAV at a location within the flight area and a predicted connectivity at the location obtained from predicted coverage data indicating network coverage in the flight area and currently used for guiding the UAV, and performing the guiding the UAV based on the received report of the connectivity anomaly at the location.

Further provided is a non-transitory computer-readable medium having stored thereon instructions to cause processing circuitry of a server apparatus for detecting connectivity anomalies for guiding an unmanned aerial vehicle, UAV, in a flight area within airspace to execute the steps of acquiring a result of a connectivity measurement performed by the UAV or a communication terminal different from the UAV at a location within the flight area; and determining a deviation of the result of the connectivity measurement from a predicted connectivity at the location to detect a connectivity anomaly at the location, wherein the predicted connectivity is obtained from predicted coverage data indicating network coverage in the flight area and currently used for guiding the UAV.

Also provided is a non-transitory computer-readable medium having stored thereon instructions to cause processing circuitry of an aviation control node for guiding an unmanned aerial vehicle, UAV, in a flight area within air space the steps of receiving, from a server apparatus, a report of a connectivity anomaly determined based on a deviation of a result of a connectivity measurement performed by a communication terminal at a location within the flight area and a predicted connectivity at the location obtained from predicted coverage data indicating network coverage in the flight area and currently used for guiding the UAV, and performing the guiding the UAV based on the received report of the connectivity anomaly at the location.

BRIEF DESCRIPTION OF DRAWINGS

In the following detailed description, exemplary embodiments are described in more detail with reference to the accompanying figures and drawings, wherein.

DETAILED DESCRIPTION

Figure 1:
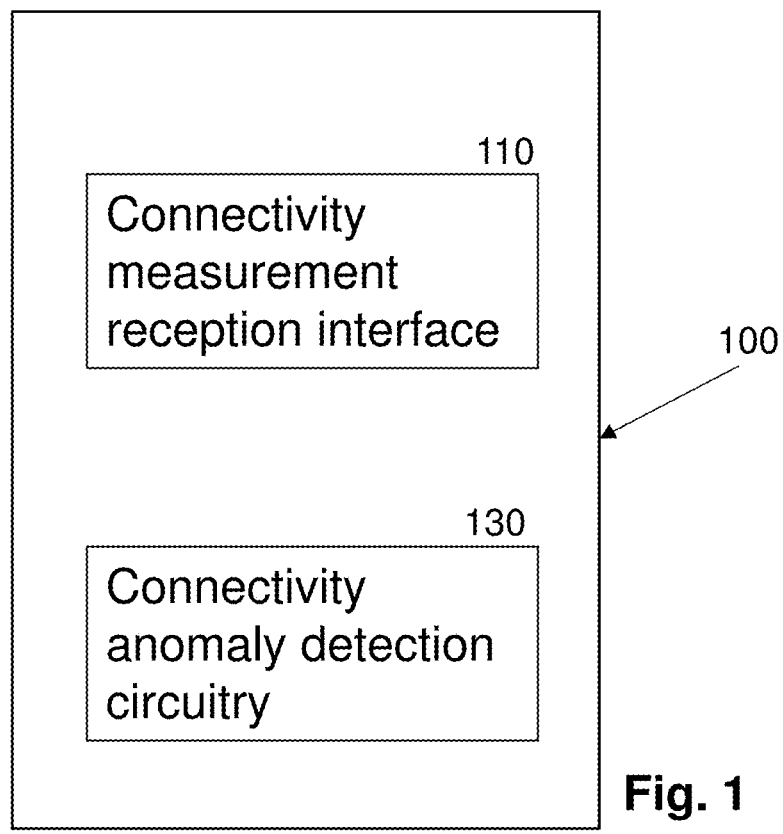
FIG. 1 is a block diagram of an apparatus for detecting connectivity anomalies.

In addition to manned aviation, unmanned aviation involving unmanned aerial vehicles (UAVs) is evolving.

Conventionally, UAVs fly within a remote human operator's line of sight, and operation BVLOS (beyond visual line of sight) is only permitted in exceptional situations.

To allow for continuously monitoring and controlling UAVs in BVLOS operation, which is considered mandatory due to safety requirements, a stable and reliable radio connection is needed.

In order to provide guidance for the UAV traffic, mobile communication systems and other radio systems represent an efficient approach. The development of UAV traffic management systems (UTMs) for handling the air traffic management and air traffic control in unmanned aviation imposes new requirements on mobile radio systems applicable to unmanned aviation.

In particular, for the planning of a flight path of an UAV, for risk assessment, e.g. by SORA (specific operational risk assessment) processes, as well as confirmation of the flight path and air traffic control clearance by aviation authorities, precise and current predictions of the availability of radio signals along the flight path are needed.

However, as the conditions of air space may change rapidly, so called NOTAMs (Notice to AirMan) are used in manned aviation to inform the pilot about recent changes in air space and to issue warnings about prohibited areas.

However, conventional radio communication technologies do not provide any warnings to a user that a signal or a network capacity is not as good as expected.

Merely for certain system relevant technologies, such as the selection of a coding method for the transmission of a signal, a mobile terminal measures so-called "Channel Quality Indicators" and transmits these indicators to a network node in order for the network node to adapt the coding of the data, to adjust to the changing conditions in the radio channel, so that the maximum data rate for that condition can be transmitted on that channel.

Moreover, so-called "Fault Management Systems" are known. Such systems deliver error messages of the mobile communication system, such as overload or outage of a network node. However, a great number of such error messages are usually generated, which are administrated in a central node. Accordingly, the analysis of erroneous network behavior may be accomplished only after delay.

Nevertheless, such fault management systems are not sufficient for providing a sufficient amount of safety in communication systems to meet the requirements of air traffic management and aviation applications.

Accordingly, if a UAV no longer receives a sufficiently strong signal during a flight, an emergency procedure is initiated. Conventionally, such emergency procedures include turning around and moving back towards a starting location, searching for a landing place, and rising.

Wireless radio networks and the radio signal provided by these networks have a dynamic nature, which is due to, e.g., outages of network nodes, changes in the actual network load based on more users are connected or more data being downloaded, or sudden changes in external conditions such as weather.

In view of this dynamic nature of radio networks and of the requirements of air traffic management, in particular UTM systems for operation BVLOS, the present disclosure provides techniques for facilitating timely identification of unexpected irregularities in network performance and reporting to aviation control and monitoring centers, which may facilitate enhancing safety in flight operation.

The techniques disclosed include an apparatus 100 for detecting connectivity anomalies for guiding an unmanned aerial vehicle (UAV) in a flight area within air space. The apparatus 100 is shown in FIG. 1.

The connectivity anomalies may be detected for the purpose of guiding a UAV or a plurality of UAVs. Herein, a UAV may be a drone or any flying aircraft or in general a vehicle which is fully controlled or assisted by a control or assisting instance such as an aviation center via a wireless communication system, e.g., aviation authority, UTM service.

In particular, the UAV may be a radio controlled UAV which receives control commands from a remote aviation control node, such as a UTM system or a UAV service provider, via wireless radio network. These control commands may include steering commands such as a change in direction or height or other commands for controlling the flight operation, e.g. power usage or requests for information, such as connectivity measurements.

However, An UAV may also have a lower degree of control corresponding to a higher degree of autonomous operation. In such a case, the UAV may receive use the radio connection for receiving information for assisting autonomous control, such as navigation information, warnings, requested destinations, or information on traffic such as other UAVs or aerial vehicles, or on weather, as well as transmitting mission critical data to a control center, such as live camera or sensor data from for example, but not limited to, public safety, search and rescue missions.

In this disclosure, the expression "guiding a UAV" or "guiding UAVs" generally refers to command and/or control operations in UAV traffic management and control. For instance, guiding of UAV(s) includes at least one of the permission and prohibition of UAV flights in the flight area or a subsection of the flight area, granting of air traffic control clearances, or the issuance of warnings regarding UAV operability in the flight area or subsections of the flight area. Such operations may be performed by aviation authorities. In addition or alternatively, guiding of UAV(s) may further include at least one of the planning and determination of flight paths or a corridor in the flight area for a UAV flight in advance of a flight of a UAV as well as control and navigation during the UAV flight or flying operation. Therein, the control and navigation may include following a previously determined flight path as well as deviating from the previously determined flight path in view to a current or recent change in network connectivity or other conditions, e.g. weather, in the flight area. "Guiding UAVs" may further include providing data for guiding.

The flight area is a three-dimensional (3D) flight area within three-dimensional air space.

The flight area is a three-dimensional (3D) flight area within three-dimensional air space. The flight area is not limited to any particular area size, and may range, for instance, from an urban area to an area equal to or larger than the state area of, e.g., Germany (which is 357 386 km$^2$). For air traffic of UAVs, the height may typically range from ground level to a maximum flight altitude or height which may limited by law or regulations. Exemplary mandated maximum flight heights for UAVs are 400 feet above the ground in the USA and about 150 meters above the ground in Europe (see references *Fact Sheet—Small Unmanned Aircraft Regulations* (Part 107), Federal Aviation Administration (2016), https://www.faa.gov/news/fact_sheets/news_story.cfm?newsId=20516 and *UAS ATM CARS Common Altitude Reference System Discussion Document*, European Organisation for the Safety of the Air Navigation (2018), https://www.eurocontrol.int/sites/default/files/2019-

05/uas-atm-cars-v1.0-release-20181127_0.pdf, the disclosures of which are hereby incorporated by reference in their entireties).

However, the above-mentioned regulations are merely exemplary rather than limiting with respect to the flight area or height for the applicability, as UAVs may in principle fly significantly higher.

The 3D flight area may partially or completely include the area of service of the communication network.

The apparatus 100 comprises a first interface 110, or "connectivity measurement reception interface" configured for acquiring a result of a connectivity measurement. The connectivity measurement is performed by the UAV or by a communication device different from the UAV at a location or position within the flight area.

In this disclosure, "acquiring" may include reception or retrieval of data.

Moreover, the term "interface" refers to an input and/or output processing structure which may include one or more protocol layers defining in which format the data are received or transmitted and how the data are to be interpreted. Such interface may be wired or wireless. Moreover, an interface may comprise one or more connections to one or more processing nodes, or may be an internal interface, e.g. to an internal memory.

For instance, if a plurality of UAVs are being operated, the connectivity measurement may be performed by one of the plural UAVs. The UAVs which are guided may include the UAV that has made the measurement and may further include different UAVs. Accordingly, based on an anomaly detected based on a measurement by one UAV, a guiding operation or decision may be made for the same UAV and/or one or more different UAVs.

However, the connectivity measurement may also be performed by a communication device which is not a UAV, e.g. a mobile phone or smartphone, a tablet computer, a sensor connected to a mobile network, or a navigation system or on-board unit of a connected car.

In general, the measurement may be performed by a user equipment, user terminal, or mobile terminal, as well as well a base station of a wireless communication network or radio communication network.

The connectivity measurement results, which are an example of current network data, may also include measurements from the running system which are conducted in the network directly, e.g. by means of network probes that monitor the respective interfaces. Such network data is continuously monitored for each IMSI (International Mobile Subscriber Identity), which uniquely identifies respective users of a wireless network. To this end, call trace technologies may be implemented by the operators of the wireless networks. Therein, information about performance of the network generated by the mobile terminals or communication devices, such as reports of connection failure, are collected by the operator on a server or some other entity. Thus, such data can be derived for each UAV or other communication terminal in the network that embodies a SIM (subscriber identity module) card for communication as well as identification. Moreover, the data about performance may be combined with positional data of the reporting mobile communication device. Accordingly, in addition or alternative to measurements by UAVs, the current network data may include measurements performed by other communication terminals or user equipment different from UAVs, such as mobile phones or tablet computers.

The current network data may include an indication of the number of communication terminals per area unit, e.g. a local density of communication terminals. For instance, a current number or an aggregated number of communication terminals per unit area, which is aggregated over a period of time, is provided. The current number of communication terminals per area is reported to the aviation control node, in addition to or included in the 3D coverage data. Such a number of communication terminals per area unit or local density may be determined by computing or collecting positions of communication devices or terminals in a cellular network. Accordingly, by determining a local communication terminal density, a "traffic density map" may be provided, representing highly populated areas, e.g. areas where many people are. Such information may vary over time, as people commute and move over the period of a day, etc.

The information on where people are however may be of very high interest to so called SORA (Specific Operations Risk Assessment) processes for unmanned aviation flight path planning and approval processes. If there is a high risk to cause any damage to people, this area may be decided to become a less preferred area for a UAV to fly over. Providing such data to UTM systems, in addition to the connectivity information, may therefore facilitate increasing the safety of the UAV operation.

For instance, a criterion in the determination of a connectivity anomaly, e.g. a threshold in the difference between predicted connectivity and measured connectivity to be applied, may be made dependent on such a local density of communication terminals.

Connectivity measurement reception interface 110 may receive the result of the connectivity measurement directly from the UAV or communication device. However, the result of the measurement may also be received via a network node or a processing node, e.g. a server or database, of a mobile network operator, of a UTM system provider or a UAV service provider. The result of the measurement may be received, for example, over a wireless channel or a wired channel.

The measurement may include a measurement of channel quality, signal power or strength, interference, signal to noise ratio (SNR), signal to interference and noise ratio (SINR), or some other quantity related to signal power and, more generally, connectivity. E.g., the measurement may be based on reference signal or data signal.

The result of the connectivity measurement may be called a current result which represents a current status of connectivity at the location. Accordingly, latency between measurement and acquiring of the result shall be kept low.

In addition to the result of the measurement, an indication of the location within the flight area where the measurement has been performed may be received. For instance, the location may be measured by means satellite navigation such as GPS (Global Positioning System) or by deriving the location of the measuring device relative to a plurality of radio network nodes from the signal strength(s) of the signals received from the respective nodes. However, in some cases, the location may be known or determined by the apparatus 100, e.g. by circuitry 130, without receiving an indication, for instance if the measuring device is stationary or if a flight path of a UAV is known in advance.

Apparatus 100 further comprises circuitry 130 configured for determining a deviation of the result of the connectivity measurement from a predicted connectivity at the location to detect a connectivity anomaly at the location. The predicted connectivity is obtained from predicted coverage data indicating network coverage in the flight area including the location and currently used for guiding the UAV or UAVs.

The predicted coverage data and, thus, the predicted connectivity may be determined based on at least one of a model, on a simulation, on result of previous connectivity measurements recorded prior to the current connectivity measurement result and/or measurements performed at other locations in the flight area or in some area different from the flight area used as testing or calibration data.

Figure 2:
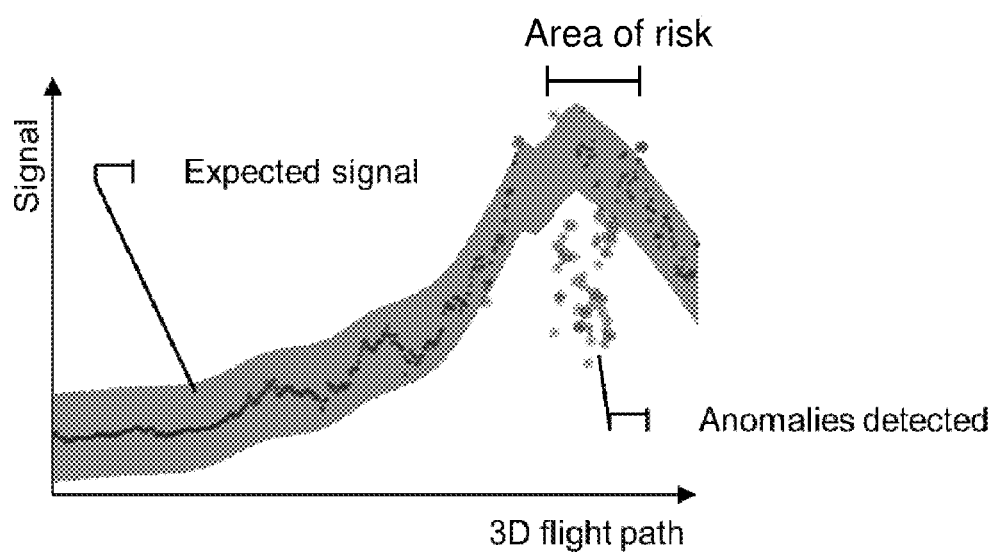
FIG. 2 is a graph showing dependency of a signal power on a flight path.

The connectivity anomaly may be a deviation or a difference of a parameter value of signal power or, e.g., another one of the above-mentioned quantities relating to connectivity, from a predicted value of the parameter. For instance, the predicted value may deviate from a single value, which may be based on an aggregation or estimation, or from an expected or acceptable range or interval, as shown in FIG. 2. Typically, an anomaly is present if the performance, e.g. signal power, is different from a predicted, expected or required value (e.g. a lower measured signal power or a higher measured interference).

There may be a distinction between different types of anomaly. For instance, a first type of anomaly may be a difference between the predicted and the measured connectivity exceeding a threshold which is determined to be critical for safe UAV flight and guidance operation. However, deviations below such a threshold may be determined as well, as a second type of anomaly, e.g. in order to react on time to prevent an emergency from occurring.

The apparatus 100 may be a processing node such as a server, an array of servers, or a data base, e.g. a server of a cloud computing service.

The term "circuitry" refers to processing circuitry such as one or more processors or CPU(s) (central processing unit(s)), and includes hardware components such as ASIC (application specific integrated circuit), FPGA (field programmable gate array), software implementations running on any hardware, or any combination of hardware and software.

Determining a deviation includes calculation, e.g. calculation of a difference between the result of the connectivity measurement and the predicted or estimated connectivity. Based on the result of this determination or calculation, it is decided or determined whether or not a connectivity anomaly is present. Detection of a connectivity anomaly includes this decision whether or not an anomaly is present.

Apparatus 100 for detecting connectivity anomalies may be operated by and/or deployed at one or more of a service, operator or institution such as communication network operator, an aviation service such as aviation authority, UTM system, or a data processing service providing coverage data for an aviation service, depending on where, e.g. at which of these services, stored and current network data is available. For instance, different UAVs may be connected to different communications networks, e.g. networks operated by different operators, and may deliver measurements to processing nodes deployed by the respective operators.

However, processing for determining the connectivity anomalies may be split between or distributed among one or processing nodes operated by a network operator, an aviation authority or UTM service, UAV service provider and an intermediate data processing service such as a hub data center between the network operator and the aviation/UAV operator. In such a case, apparatus 100 may constitute a processing system comprising a plurality of processing nodes.

Figure 3:
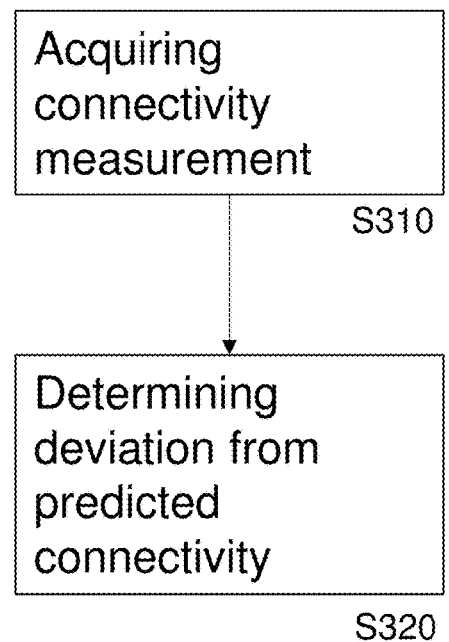
FIG. 3 is a flow chart of a method for detecting connectivity anomalies.

In correspondence with the above described apparatus 100, provided is a method for detecting connectivity anomalies for guiding at least one UAV in a flight area within air space. As shown in FIG. 3, the method includes a step of acquiring S310 a result of a connectivity measurement performed by the UAV or a communication device different from the UAV at a location within the flight area. The method further includes a step of determining S320 a deviation of the result of the connectivity measurement from a predicted connectivity at the location to detect a connectivity anomaly at the location. Therein, the predicted connectivity is obtained from predicted coverage data indicating network coverage in the flight area and currently used for guiding the UAV.

In this disclosure, details on examples and embodiments shall refer to the disclosed apparatuses as well as methods, unless the context or explicit indication indicates otherwise.

To enable control and navigation of a UAV, in particular during operation BVLOS, the UAV may be connectable to network nodes of one or more wireless communication networks or radio communication networks.

The wireless communication network(s) may comprise a cellular system such as UMTS, LTE or New Radio, 4G, 5G, WiMAX or any other network. Network nodes may include, for example, base stations of the wireless communication systems or networks, such as an eNodeB or similar base station of LTE, which have one or more transmission and reception antennas. However, this disclosure is not limited to the above-mentioned systems, and other terrestrial systems or different systems such as satellite radio systems may be included as well. Accordingly, in addition or as an alternative to base stations, the network nodes may include satellites.

The predicted connectivity may be determined or computed by apparatus 100 or determined by and acquired from a remote processing node or server different from apparatus 100.

In some embodiments, the apparatus 100 comprises a second interface configured for acquiring the predicted connectivity at the location.

The second interface may be an internal interface of apparatus 100, e.g. if apparatus 100 computes the predicted connectivity. For instance, apparatus 100 may include a memory or data storage configured for storing the predicted connectivity, or circuitry configured for computing the predicted connectivity upon enquiry and/or input of the location. Then, the internal interface may be configured for retrieving the predicted connectivity from the data storage or from the circuitry.

On the other hand, if the predicted connectivity is determined or computed by an external node or processing device or node different from apparatus 100, the second interface may be an external interface over which apparatus 100 with the external node or processing device.

In some embodiments, the connectivity anomaly at the location is automatically reported to one or more aviation control nodes. The one or more aviation control nodes may include at least one of an aviation authority, UTM system, ATM (air traffic management) system, and UAV service provider.

Accordingly, for radio controlled UAV operation, warning signals or messages or "radio NOTAMS" corresponding to the aforementioned conventional "NOTAMS" may be delivered to control systems.

Moreover, upon reception, an aviation control node receiving the report of the connectivity anomaly or a warning signal, such as a UTM system, may direct the UAV to avoid or move away from the location at which the connectivity anomaly has been detected or perform decisions about air traffic control clearances. E.g. UTM systems may calculate new routes in which the area of risk is avoided, which may facilitate safe operation. Furthermore, for UAVs within an area of risk, more efficient decisions may be made, in comparison with the above-mentioned emergency procedures such as turning around, if a connectivity anomaly is detected and reported on time, e.g. when the signal power is still sufficient to guide the UAV out of the area of risk.

For instance, the location where the connectivity measurement has been performed, and for which the presence of a connectivity anomaly is tested, is recorded or traced along three dimensions of the three-dimensional flight area, and the predicted coverage data indicates predicted network coverage along three dimensions.

E.g., the location where the UAV or other communication device performs the measurement is indicated as three coordinates including a height. Knowing the occurrence of an anomaly in three coordinates may allow for a more precise and more efficient guidance of UAVs around the location of abnormal connectivity. For instance, if the anomaly occurs at a certain height, UAVs may be guided to pass or fly below or above the location of the anomaly.

However, the location of measurement or location of connectivity anomaly may also be recorded along two-dimensions, e.g. geographical coordinates without height. In this case, it is still possible to guide the UAVs to pass the location of anomaly sideways or laterally.

As mentioned above, the connectivity anomaly may be at least one of an anomaly of signal power, including an anomaly of, e.g., signal to noise ratio (SNR), signal to interference and noise ratio (SINR), or channel quality. The connectivity anomaly may additionally or alternatively include a handover probability of a handover to be performed by the UAV from one network node, with which the UAV is currently connected, to another network node of the wireless network by which the flight of the UAV is controlled or an indication of handover probability.

For instance, if a UAV performs a greater number of handovers between network nodes or is handed over a greater number than expected based on the predicted coverage data or predicted connectivity, the difference between the actual and the expected or predicted number of handovers may be determined to be an anomaly of the handover probability.

It should be noted that the handover probability may not only depend on a location where the UAV is currently flying and taking measurements, but also on at least one of speed, moving direction, and flight path or trajectory of the UAV.

The handover probability is a change probability of a change of the network node, from among the network nodes of the communication network or system, with which a UAV (or any other mobile communication device) is currently connected. The change probability is a probability with which the UAV will switch connections from one network node to another network node.

The provision of a handover probability, which may also be switching probability, of an active connection from one network node to another network node, may facilitate the choice of a stable and lasting connection particularly when the connected device such as a UAV is moving in air space at a certain height (e.g. 150 m) above ground. This is because at such height, a plurality of network nodes possibly having similar signal powers may be identified by the UAV, depending, e.g., on topography, network design, and position of network nodes as well as of the UAV. Moreover, a UAV may not necessarily change or switch network nodes immediately whenever another network node is detected to have a stronger signal power than the network node to which the UAV is currently connected. For instance, to prevent too frequent switching, a change of network nodes may be performed only when the signal of the other, unconnected network node is determined to be significantly stronger for a given time interval.

For instance, the handover probability may be dependent on at least one of a location, a moving speed, a moving direction, and an envisaged or planned flight path or trajectory of the UAV.

For instance, for a mobile receiver (e.g. UAV) to change from one network node A (best serving network node) to another network node B, the signal received at the UAV from network node B has to exceed the signal level network node A by a defined threshold, a delta greater than zero. Also, this signal has to be continuously better for a defined time interval. Only if the received signal from Node B is better by a defined signal delta—a handover-threshold—for the duration of a given time, the serving node will be changed.

Based on the above-mentioned or other rules for a change between network nodes, a change probability may be predicted by comparing the signal strengths of different network nodes in the flight area or along a planned or flight path or a plurality of possible flight paths of a UAV. Alternatively, the determination of a change probability may be based on a count of handovers of UAVs which have actually been performed per area in a given time interval.

Alternatively, rather than outputting a handover probability, the determination of a signal power may take into account the above-mentioned handover threshold or a bias for the network node with which the UAV is currently connected.

In wireless networks, the change of serving nodes is one of the dominant risks for connectivity loss. Therefore, for fast moving UAVs, who have a very different visibility to signals from various network nodes—compared to terrestrial users, the 3D areas with high probability of network node changes are less suitable for safe UAV BVLOS operation. Thus, the provision of a change probability of a change of connections of a UAV among network nodes may facilitate determination of safe regions for UAV traffic within the 3D flight area.

The provision of the handover probability (or a probability of handover between network nodes/cells) of a currently connected network node may facilitate optimization of flight paths by UAV service providers in view of a stable connection and or in view of saving energy and processing power otherwise needed for monitoring the signal strengths of network nodes or switching operations.

Although the above description of a handover probability mainly referred to UAVs, the provision of a handover probability is applicable to other mobile devices, such as connected vehicles, as well.

When a connectivity anomaly is detected at a location in the flight area, aviation of UAVs, in particular BVLOS, UAVs are to be guided away from the location of anomaly, and UAVs are not to be guided towards the vicinity of the location. In some embodiments an area of risk, which includes the location of measurement, is determined, where aviation of UAVs is to be avoided and out of which UAVs are to be directed.

There are several examples as to how the area of risk may be determined.

Firstly, the area of risk may be determined or delimited based on a plurality of connectivity measurements received from one or more UAVs or different communication devices. E.g., connectivity measurement reception interface 110 may be configured for acquiring a plurality of results of connectivity measurements at a plurality of locations including the location. Further, circuitry 130 may be configured for determining the area of risk based on the plurality of results of connectivity measurements.

For instance, as illustrated in FIG. 2, it may be identified from a sequence of measurements performed along a flight path of a single UAV at what position the UAV enters and/or leaves an area in which one or more measured values of the signal or connectivity-related parameter exhibit a connectivity anomaly. This area may be determined to be an area of risk.

Moreover, if measurements from different communication devices are available, possibly including one or more sequences of along UAV flight path(s), a boundary of an area of risk may be determined to separate measurement locations where the anomaly is determined to be present and locations where the anomaly is determined not to be present.

Determining the area of risk based on a plurality of connectivity measurements may facilitate precisely identifying the boundaries of the area of risk, which may be enable efficient redirecting an navigation of UAVs for circumventing the area of risk without unnecessary detours.

Figure 4:
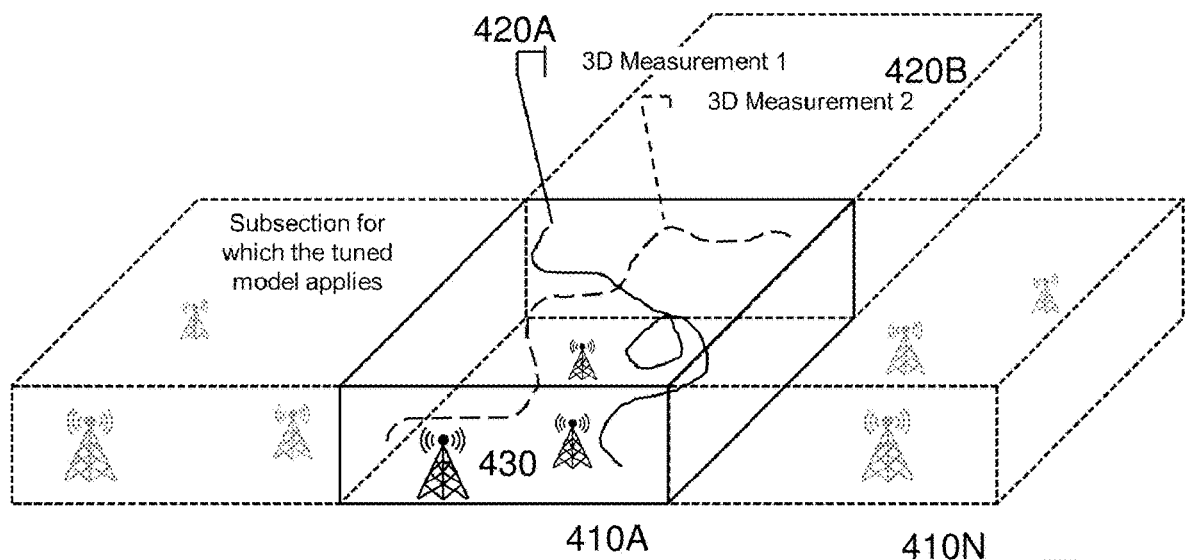
FIG. 4 is a graph showing a division of the flight area into sub-areas.

Secondly, in some exemplary embodiments, the flight area is subdivided into a plurality of subareas, and circuitry 130 may be configured for determining the area of risk to include a sub-area from among the plurality of sub-areas. An example of a subdivision of the flight area into sub-sections is shown in FIG. 4. For instance, the subarea including the location of measurement or the location of anomaly may be determined to be the area of risk. Such an approach may facilitate identifying areas of risk in a quick and effective manner.

The determination of the predicted or estimated coverage may be based on a model. An exemplary model for estimating coverage based on current and stored network data may include the following path loss and link budget equation (1) for determining a power of a signal at a receiver (e.g. a UAV on a flight path in the flight area) at a given location:

$$P_R = P_T + G(\varphi, \theta) - PL(d, h), \quad \text{equation (1)}$$

where
$P_R$ is the power at the receiver (dBm, decibel-milliwatts);
$P_T$ is the (transmission) power of the transmitter/antenna/cell (dBm);
d is the distance between transmitter and receiver in meters;
h is the height above ground (flight height) of the UAV in meters;
$\varphi$ and $\theta$ are the relative azimuth and elevation (view angles) of the UAV, as seen from the cell (e.g. taking the mechanical tilt/antenna tilt and azimuth into account); and
$G(\varphi, \theta)$ is the directivity (gain minus masking loss) of the cell/antenna; and
PL(d,h) is the path loss.

For the determination/estimation of the path loss, a general model in accordance with the following equation (2) may be used:

$$PL(d,h) = (\alpha_1 + \alpha_2 \cdot \log(h)) \cdot \log(d) + \beta_1 + \beta_2 \cdot \log(h) \quad \text{equation (2)}.$$

The coefficient $\alpha_2$ is negative (forced by constraints in the tuning process), so the path loss exponent $\alpha(h) = (\alpha_1 + \alpha_2 \cdot \log(h)) \cdot \log(d)$ is decreasing with increasing height. $\beta_2$ can be both positive and negative. In order to prevent the model coefficients dropping below the coefficients of a free space model at a given height $h_0$, for $h > h_0$, the coefficients are fixed with their value at $h_0$, $\alpha(h) = \alpha(h_0)$ and $\beta(h) = \beta(h_0)$ for $h \geq h_0$. This fixing of coefficients may prevent the model from underestimating the path loss at large heights.

For instance, the following coefficients from equation (3) are derived from tuning with UAV measurement data. They may be used in a default model, i.e. in an area where no measurement data is available as input into the system, for the frequency of 800 MHz:

$$PL(d,h) = (27.105 - 1.63149 \cdot \log(h)) \cdot \log(d) + 31.3353 + 0.735305 \cdot \log(h) \quad \text{equation (3)}.$$

For other frequencies, frequency-correcting terms are applied to the constant coefficients $\alpha_1$, $\alpha_2$, $\beta_1$, and $\beta_2$ of the model.

Based on more measurement data available, and more advanced models being developed, additional coefficients and model components describing physical behavior may be added.

The three-dimensional area may be subdivided into a plurality of sub-areas (or subsections), and current 3D coverage data is computed respectively for the plurality of 3D sub-areas (or area elements) of the flight area. An example of a division of the flight area into sub-areas is shown in FIG. 4. As can be seen, the subsections may have a substantially cube or cuboid shape (seen in a flat map/projection of the earth surface). For instance, cuboid may have sizes of 10 km×10 km (horizontal directions)×500 m (vertical direction), although the disclosure is not limited to particular sizes of subsections, and larger or smaller subsections may be used as well. For instance. Although not shown in FIG. 4, there may be one or more layers of cubes in vertical direction, such as a lower layer comprising takeoff and landing heights and a higher layer comprising travelling heights.

Furthermore, there may be a hierarchically layered division or partition of the flight area. For instance, a first layer of sub-areas may be "tiles" of 1° by 1° in longitude and latitude in WGS 84 coordinate system, which equals about 60 nautical miles in each direction at the equator. These tiles may then, as a second hierarchical layer of sub-areas, further be subdivided into subsections or "sub-tiles" (the size of which may be, e.g., the above-mentioned 10 km×10 km×500 m).

For instance, a flight area may be divided into sub-areas, wherein a hierarchically layered partitioning may be applied. In the following, it is described with reference to FIG. 4 how such a subdivision of the flight area may be applied to model calibration or model tuning. For instance, the cuboids depicted in FIG. 4 as sub-areas may be the above-mentioned subsections of the WGS-84-1-by-1-sized tiles.

For instance, these tiles or the flight area may be divided into subsections or sub-areas for tuning, depending on where there are measurements available. If a new measurement is received, for instance in a measurement file, a 3D bounding rectangle or cuboid is generated around these measurements as a sub-area, and in this sub-area, the modelling specifically to these measurements is done. This very specific model is then applied to all the network nodes included in that bounding rectangle or cuboid. Hence, the modelling accuracy is enhanced in this sub-area for which the measurements have been obtained. In addition, the tuning with these measurements may also be applied for other regions in the flight area or the entire flight area. Accordingly, even in places or regions from where no measurements are available, the models are incrementally enhanced, but in the subsections or sub-areas where the measurements are actually performed, the accuracy will be greater.

Based on more measurement data available, and more advanced models being developed, additional coefficients and model components describing physical behavior may be added.

In case that measurement data is available in a specific subsection or sub-area of the 3D airspace, dedicated advanced algorithms and machine learning methods may be applied to automatically enhance the model by tuning it with the respective measurement data.

FIG. 4 shows an example where a 3D airspace is divided into subsection 410A to 410N. In subsection 410A radio signal measurements in 3D are available, 420A and 420B. The model within subsection 410A will now be tuned using measurement 420A. Then, this model will be applied to the network nodes 430, which are within the subsection 410A.

The subsection could also be adaptively formed around the first available measurement 420A, such that the subsection is defined by a bounding rectangle around the measurements.

With the availability of more measurements within subsection 410A, such as 420A and 420B, machine learning algorithms will enhance the tuning accuracy and reliability by means of Supervised Learning methods.

Supervised learning in this context is the machine learning task of learning the function that maps the measurement input data to the output of the tuned output modelling. It infers the model function from the labeled training data consisting of the measurement data and the output model. With each additional input data the algorithms analyze the historical training data together with the new data samples and produces an inferred function that will then be used for the processing of new examples.

For instance, measured values of a parameter such as a signal power are input into the machine learning process. As an output, a model of the signal power is provided, which is based on previously received stored data of the signal strength and updated with each newly received current measurement value or data item. Furthermore, constraints such as weather, current state or configuration of the network, or terrain may be input into the learning process.

In subsections where no measurement data is available, such as 410N, models will be applied to the respective network nodes within that subsection, which are based on a plurality of measurements available for other subsections, as exemplified above by equation 3, but not specific to the targeted 3D sub-area or subsection.

Accordingly, model tuning, as disclosed, is applicable if an increase measurements is expected in the future. Namely, in an incremental way, by automatic learning mechanisms, the models will get better, i.e. more accurate and more reliable, whenever a new measurement is performed and new measured data is obtained. Applicable to all sites in the "tiles", and specifically the case in the sub-tiles (subsections).

In case that measurement data is available in a specific subsection or sub-area of the 3D airspace, dedicated advanced algorithms and machine learning methods may be applied to automatically enhance the model by tuning it with the respective measurement data.

For instance, sub-areas which are determined to compose areas of risk when connectivity anomalies are detected may be the same sub-areas which are used in the modeling process for generating 3D coverage data. Alternatively, different granularities may respectively applied for modeling and for determination of areas of risk.

In addition to current measurement values, further current or stored network data or connectivity data may be used for modeling and predicting a current coverage. For instance, locations of network nodes may be stored. Examples of the current network data included by the connectivity data, may include but are not limited to of network nodes of the respective communication networks:

Node data or node location data such as Market ID (for the location of the network node); eNodeB ID (network node identification in LTE); Sector Number; eNodeB Name; eNodeB Activity Status; Network node Longitude; Network node Latitude; Network node Altitude; Cell ID (network specific identification of the respective network node); eCGI (E-UTRAN Cell Global Identifier—for unique global identification of the network node); Physical Cell ID; Height of the Antenna position; Antenna (type, name), Antenna Gain; Antenna Azimuth (in degrees relative to absolute north); Antenna Mechanical Downtilt (in degrees relative to the horizontal plain); and Antenna parameters or transmission/reception characteristics, such as Reception losses (dB—decibel); Transmitter Transmission losses (dB); Transmitter Max Power (dBm—decibel relative to a Milliwatt); EPRE (Energy Per Resource Element) per antenna port (dB); Total ERP (effective radiated power, W—Watt); Total EIRP (equivalent isotropically radiated power, W).

Regarding the above mentioned node data and node location data, some of the included information may be provided as current network data although location data of network nodes is already included in the stored network data, as mentioned above. However, for stationary network nodes, provision of node or node location data in the current network data may facilitate validating and/or updating the stored network data or the current connectivity state of the network nodes. Furthermore, for moving network nodes such as satellites, the stored network data may for instance include an indication of a planned path of motion of the node, or previous positions of the node, whereas the current network data indicates a current position.

It should be noted that the connectivity data is not restricted to data describing a current status. In addition, "event data", e.g. an indication of known future events, may be received by the second interface, wherein the future events are known to occur at a point in time later than the reporting of the events and the reception at the second interface. Such known future events include future OFF states of network nodes due to planned maintenance or repair works, an installation of a new antenna, or a relocation or removal of an existing network node or antenna. Furthermore, in the case of satellite networks, such known future events may include the launch or startup of a new network satellite or a known correction of an orbit of a satellite.

A connectivity anomaly may be determined to be present, for example, if a difference between a threshold and an expected value predicted value exceeds a certain threshold, or if one or more measurement values lie outside a given tolerance range. However, as mentioned above, deviations below a threshold may be recorded or analyzed as well.

For instance, in some embodiments, if a plurality of results of connectivity measurements locations are acquired, for instance measurements performed at a plurality of locations and/or time instances by one or more UAVs or other communication devices, a trend in the deviation may be determined dependent on time or a direction in the three dimensional flight area.

A trend may include an increase in a difference of a measured connectivity from a predicted connectivity in a direction or dimension of the flight area, in two or more measurement values subsequent in time obtained at a given position or by a given measuring device.

In addition the criteria of exceeding a threshold and a trend may be combined. E.g. an anomaly may be detected, a deviation of prediction and measurement lies above a threshold, and a plurality of values lying outside this threshold further exhibit a trend.

Identification of a trend in the measured values towards a connectivity anomaly may facilitate detecting a connectivity anomaly before the deviation of the actual signal or connectivity from an expected or predicted signal or connectivity becomes critical or exceeds a critical threshold. Accordingly, warnings may be issued on time, and redirection of UAVs or alteration of flight paths may be performed in a timely manner before occurrence of an emergency.

Further, in some embodiments where the UAV is connectable to a plurality of wireless communication networks, the detection of communication anomalies may be performed respectively per wireless communication network or with respect to one or more networks from among the plurality of wireless communication networks. For instance, a network node may be out of order in one wireless communication network with which a UAV is currently connected. Accordingly, if such a network-specific anomaly occurs, it may be possible that the UAV connects with or is handed over to another communication network of the same or a different type of network communication system (e.g. from an LTE network of a first operator to an LTE system of a second operator, or from a terrestrial radio network to a satellite radio network).

Accordingly, the present disclosure may facilitate exploiting redundancy in connectivity, allow for switching from one network exhibiting a connectivity anomaly to another network where no anomaly currently occurs at the same location, and thus may enhance safety and efficiency, since detours of UAVs or recalculation of flight paths due to network-specific connectivity anomalies may be avoided.

However, the present disclosure is not limited to detecting network-specific connectivity anomalies. A connectivity anomaly affecting a plurality of networks at a given location in the coverage areas may occur, for example, due to a sudden change in weather conditions, e.g. fog or heavy snowfall or rainfall, or electrical power outage.

In the above disclosure, an apparatus and method for detecting connectivity anomalies for guiding UAVs as well as their embodiments have been described. In addition, the present disclosure provides an aviation control node and a method for guiding a UAV to be performed by an aviation control node.

Figure 5:
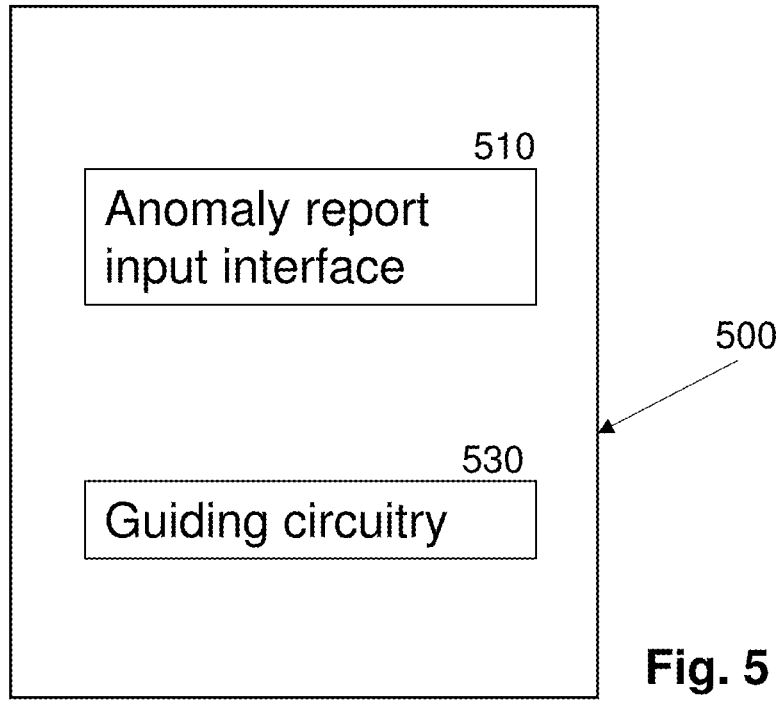
FIG. 5 is a block diagram of an aviation control node.

In particular, as shown in FIG. 5, provided is an aviation control node 500 for guiding one or more UAV(s) in a flight area within air space. The aviation control node 500 comprises an input interface 510, or "anomaly report input interface", configured for receiving a report of a connectivity anomaly. The connectivity anomaly is determined based on a deviation of a result of a connectivity measurement performed by a communication terminal at a location within the flight area and a predicted connectivity at the location obtained from predicted coverage data. The predicted coverage data indicates network coverage in the flight area and is currently used for guiding the UAV (s). The aviation control node 500 further comprises circuitry 530, or "guiding circuitry", configured for guiding the UAV based on the received report of the connectivity at the location.

Figure 6:
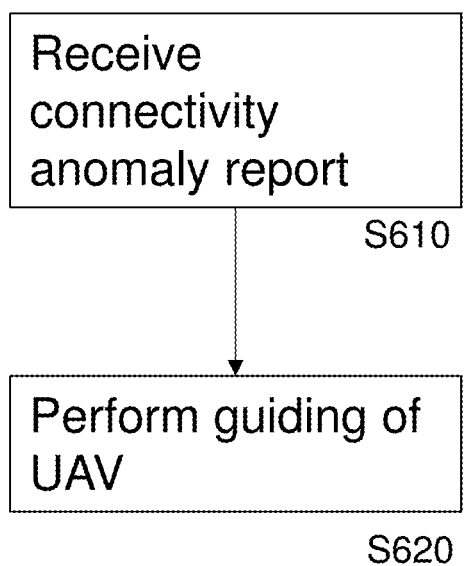
FIG. 6 is a flow chart of an aviation control method.

Further provided is a method for guiding a UAV shown in FIG. 6. The method includes a step of receiving S610 a report of a connectivity anomaly determined based on a deviation of a result of a connectivity measurement performed by a communication terminal at a location within the flight area and a predicted connectivity at the location obtained from predicted coverage data indicating network coverage in the flight area and currently used for guiding the UAV. The method further includes a step of performing S620 the guiding of the UAV based on the received report of the connectivity anomaly at the location.

In some embodiments, guiding of the UAVs may include issuing a warning signal or an avoidance command indicating that a sub-section of the flight area including the location is to be avoided by UAVs or that UAV operation is prohibited in that sub-section.

Moreover, if a network-specific anomaly is detected, the node may issue a command for handover from the network where the connectivity anomaly occurs to another network where no connectivity anomaly occurs.

For instance, the aviation control node 500 may be a node at an aviation authority.

Alternatively, the aviation control node may be a node at a UAV service provider or UTM system. For example, in some embodiments, the aviation control node 500 performs adapting the guiding of the UAV based on the received report of detected anomaly. This adaptation may include above-mentioned guiding operations such as computation or determination of an alternative flight path or navigating a UAV away from the location where the connectivity anomaly occurs.

For instance, circuitry 530 of the aviation control node 500 may be configured for determining, based on the received report of the connectivity anomaly, an area of risk where aviation of the UAV is to be avoided, following the examples and approaches described in the disclosure relating to apparatus 100.

Accordingly, determination of an area of risk may be performed by an apparatus for determining network anomalies as well as by an aviation control node. Furthermore, apparatus for determining connectivity anomalies may be an aviation control node, e.g. at an aviation authority or UTM system.

Figure 7:
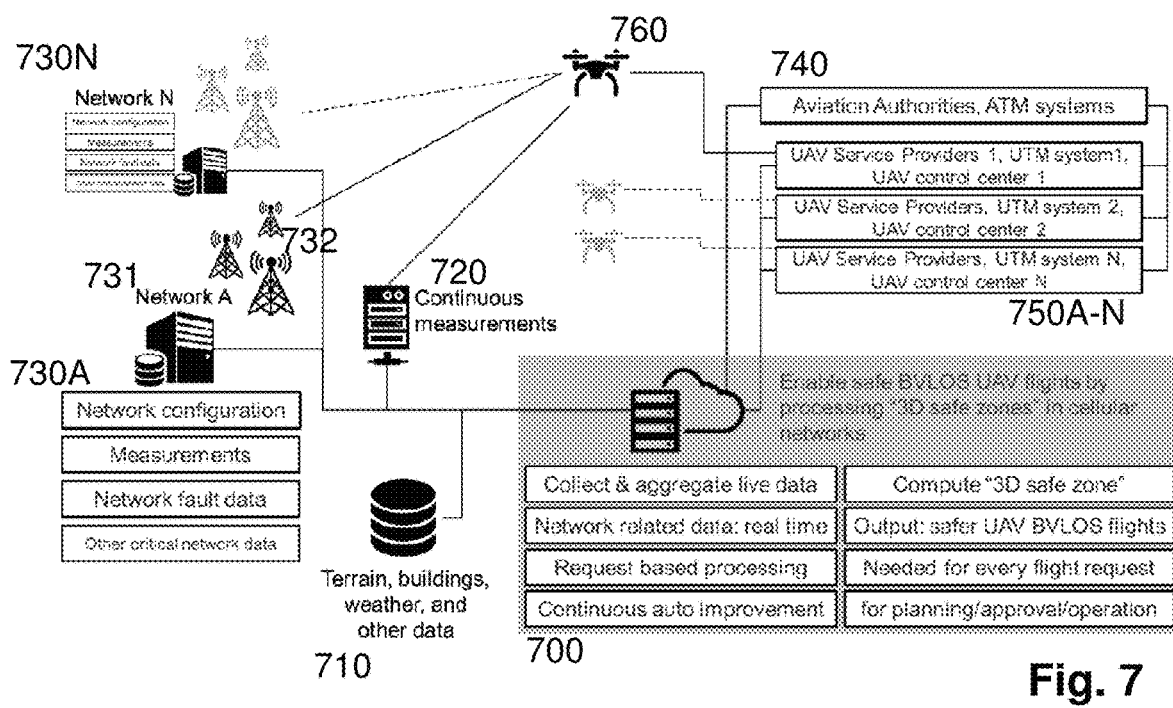
FIG. 7 is a block diagram showing a control system for UAV air traffic.

FIG. 7 shows an exemplary system for guiding UAVs. Computing node 700 connected, over a plurality of interfaces, to a plurality of networks (Network A . . . , network N) 730A-N respectively including a network server 731 and network nodes (base station including transmission/reception antennas) such as network node 732, an Aviation Authorities or ATM system as aviation control node 740, a plurality of UAV service providers 750A-N, a data server 710 or database server storing data, about terrain (topography), buildings, weather, and other data, as well as a data processing server 720, continuously or regularly receiving and forwarding (current) measurements (e.g. signal, channel measurements) from one or more UAVs (including UAV 760). In FIG. 7, computing node 700 is shown as a server of a cloud computing service.

Computing node 700 processes current network data and possibly current measurements and computes the predicted connectivity. Further, computing node 700 may embody apparatus 100 for detecting connectivity anomalies. Computing node 700 and apparatus 100 for detecting anomalies may be comprised by a single device or node, or alternatively, may be separate instances or computing nodes.

As shown in FIG. 7, computing node 700 as an instance is directly connected to aviation control nodes 700, 750A-N which perform the guiding of the UAV or UAVs.

However, the present disclosure is not limited computing node 700 and/or apparatus 100 being directly connected to the aviation control node. For instance, network-specific current coverage data may be transmitted to an intermediate data node such as a data hub which generates plural-network coverage data by combining network-specific coverage data of a plurality of communication networks.

Summarizing, the present disclosure provides an apparatus and method for detecting connectivity anomalies for guiding unmanned aerial vehicles (UAVs). The apparatus comprises an interface configured for acquiring a connectivity measurement result at a location in the flight area, and circuitry configured for determining a deviation between the measurement result and a predicted connectivity to detect a connectivity anomaly. Further provided is an aviation control node configured for receiving a report on a connectivity anomaly, and a method for an aviation control node. The present disclosure facilitates monitoring of a current connectivity state for providing safe and efficient UAV operation.

The invention claimed is:

1. A server apparatus for detecting connectivity anomalies for guiding an unmanned aerial vehicle (UAV) in a flight area within airspace, comprising:
a first interface configured for acquiring a result of a connectivity measurement performed by the UAV or a communication terminal different from the UAV at a location within the flight area; and
circuitry configured for determining a deviation of the result of the connectivity measurement from a predicted connectivity at the location to detect a connectivity anomaly at the location,
wherein the predicted connectivity is obtained from predicted coverage data indicating network coverage in the flight area and currently used for guiding the UAV,
the circuitry is configured for determining an area of risk where aviation of the UAV is to be avoided, wherein the area of risk includes the location,
the first interface is configured for acquiring a plurality of results of connectivity measurements at a plurality of locations including the result of the connectivity measurement at the location from one or more sequences of connectivity measurements along UAV flight path or paths to determine one or more boundaries of the area of risk, and
the circuitry is configured for determining the area of risk based on the plurality of results of connectivity measurements.

2. The server apparatus according to claim 1, further comprising a second interface configured for acquiring the predicted connectivity at the location.

3. The server apparatus according to claim 1, comprising a third interface configured for automatically reporting the connectivity anomaly at the location to an aviation control node.

4. The server apparatus according to claim 1, wherein the location is recorded along three-dimensions, and the predicted coverage data indicates network coverage along three dimensions.

5. The server apparatus according to claim 1, wherein the connectivity anomaly is at least one of:
an anomaly of a signal power, or
an anomaly of a handover probability of handover by the UAV at the location from one network node to another network node.

6. The server apparatus according to claim 1, wherein the flight area is divided into a plurality of sub-areas, and the circuitry is configured for determining the area of risk to include a sub-area from among the plurality of sub-areas.

7. The server apparatus according to claim 1, wherein:
the first interface is configured for acquiring a plurality of results of connectivity measurements including the result of the connectivity measurement, and
the circuitry is configured for determining, based on the plurality of results of connectivity measurements, a trend in the deviation dependent on time or a direction in the flight area.

8. The server apparatus according to claim 1, wherein detection of a plurality of connectivity anomalies including the connectivity anomaly is performed respectively for each wireless communication network of a plurality of wireless communication networks.

9. The server apparatus according to claim 1, wherein the result of the connectivity measurement includes a measurement based on network probes obtained by call tracing.

10. An aviation control node for guiding an unmanned aerial vehicle (UAV) in a flight area within air space, comprising:
an input interface configured for receiving, from a server apparatus, a report of a connectivity anomaly determined based on a deviation of a result of a connectivity measurement performed by the UAV or a communication terminal different from the UAV at a location within the flight area and a predicted connectivity at the location obtained from predicted coverage data indicating network coverage in the flight area and currently used for guiding the UAV, and
circuitry configured for guiding of the UAV based on the received report of the connectivity anomaly at the location, wherein the circuitry is configured for determining, based on the received report of the connectivity anomaly, an area of risk where aviation of the UAV is to be avoided, and
one or more boundaries of the area of risk are determined based on a plurality of results of connectivity measurements at a plurality of locations including the result of the connectivity measurement at the location from one or more sequences of connectivity measurements along UAV flight path or paths to determine the one or more boundaries of the area of risk.

11. The aviation control node according to claim 10, further comprising an output node configured for issuing a warning signal or an avoidance command indicating that a sub-section of the flight area including the location is to be avoided by UAVs including the UAV.

12. A method for detecting connectivity anomalies for guiding an unmanned aerial vehicle (UAV) in a flight area within air space, comprising the following steps to be performed by a server apparatus:
acquiring a result of a connectivity measurement performed by the UAV or a communication terminal different from the UAV at a location within the flight area;
determining a deviation of the result of the connectivity measurement from a predicted connectivity at the location to detect a connectivity anomaly at the location,
wherein the predicted connectivity is obtained from predicted coverage data indicating network coverage in the flight area and currently used for guiding the UAV; and
determining an area of risk where aviation of the UAV is to be avoided, wherein the area of risk includes the location,
wherein the acquiring includes acquiring a plurality of results of connectivity measurements at a plurality of locations including the result of the connectivity measurement at the location from one or more sequences of connectivity measurements along UAV flight path or paths to determine one or more boundaries of the area of risk, and the area of risk is determined based on the plurality of results of connectivity measurements.

13. A method for guiding an unmanned aerial vehicle (UAV) in a flight area within air space, comprising:

receiving, from a server apparatus, a report of a connectivity anomaly determined based on a deviation of a result of a connectivity measurement performed by the UAV or a communication terminal different from the UAV at a location within the flight area and a predicted connectivity at the location obtained from predicted coverage data indicating network coverage in the flight area and currently used for guiding the UAV; and guiding the UAV based on the received report of the connectivity anomaly at the location including determining, based on the received report of the connectivity anomaly, an area of risk where aviation of the UAV is to be avoided, wherein one or more boundaries of the area of risk are determined based on a plurality of results of connectivity measurements at a plurality of locations including the result of the connectivity measurement at the location from one or more sequences of connectivity measurements along UAV flight path or paths.

\* \* \* \* \*